3,503,297
ELECTRONIC KEYING SYSTEM
Arthur R. Schmoyer, Potomac Falls, Md., and George B.
Schaefer, Des Plaines, and William Wangard, Maywood, Ill., assignors to Electro-Learner Corporation, Wilmington, Del., a corporation of Delaware
Filed Nov. 12, 1968, Ser. No. 774,997
Int. Cl. G09b 15/04
U.S. Cl. 84—478        5 Claims

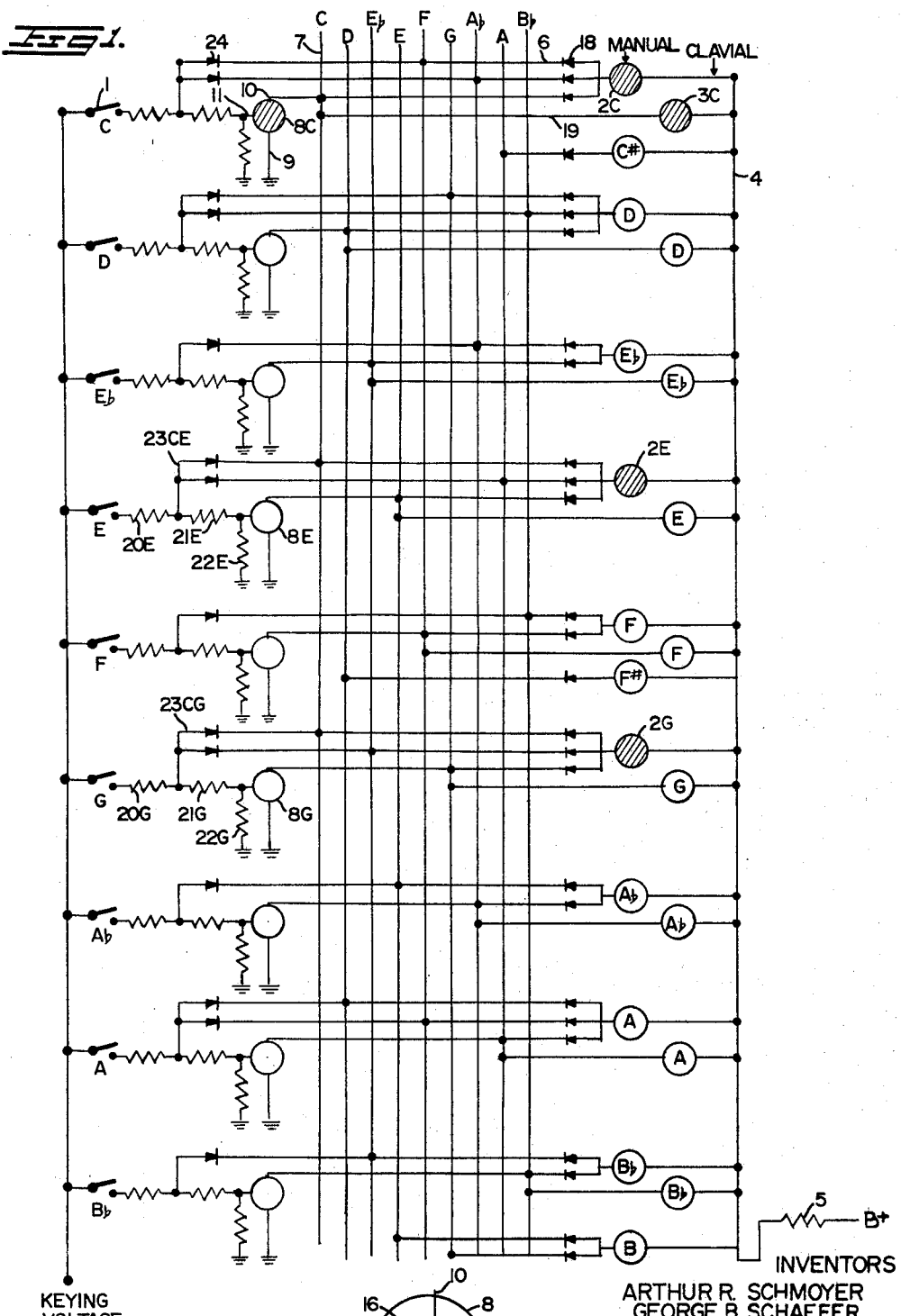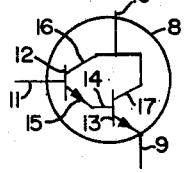

ABSTRACT OF THE DISCLOSURE

An electronic keying system particularly adaptable to keyboard teaching devices uses a plurality of high impedance input solid state switching devices, a selected one of said devices being triggered upon keying to simultaneously activate a plurality of functions and while so triggered inhibiting the triggering of other subsequently keyed switching devices.

RELATED APPLICATIONS

This application is a species of the invention disclosed and claimed in application Ser. No. 654,189, filed July 18, 1967 by Arthur R. Schmoyer, James J. Dozier, Jr., Richard H. Bradford, and John E. E. Boswell, Jr.

SUMMARY OF THE INVENTION

This invention relates generally to a visual keyboard teaching device susceptible of use with any keyboard where plural keys of a predetermined group herein referred to as companion keys, must be struck simultaneously, and specifically relates to a device for use with the keyboard of an organ or similar musical instrument. The invention provides a visual indication of the companion manual and clavial keys to be associated to sound a chord triad, and accompanying bass note, this indication being activated by the initial manual selection of a key corresponding to the root note by which the chord is designated. The activation of the indicators is accomplished in various embodiments by mechanical switches activated simultaneously with depression of the root key, touch plates activated in advance of actual depression of the key by mere contact of the finger with the key surface, or by proximity of the finger to the key surface, and has activation functions through specific circuitry including a diode matrix and associated activating, enabling, and inhibiting circuits.

BACKGROUND OF INVENTION—PRIOR ART

As set forth in the aforementioned copending application, attempts to avoid the laborious efforts inherent in generally accepted music teaching techniques have developed teaching aids utilizing light indicators to display to the student the appropriate key or keys to be depressed. Basic among these devices are these involving a record media which produces light indications of the proper sequence of melody keys to be depressed in order to play a pre-recorded melody, such as disclosed in U.S. Patent 1,733,477, issued Oct. 29, 1929 to E. S. Votey, and in U.S. Patent 3,069,959, issued Dec. 25, 1962 to J. Foufonnis et al. Further improvements in the aforementioned type of teaching devices are the subject matter of U.S. Patents 3,353,453 and 3,377,716, issued Nov. 21, 1967 and Apr. 16, 1968, respectively to Arthur R. Schmoyer.

In U.S. Patent 2,820,391, issued Jan. 21, 1958, to Webster E. Janssen, there is disclosed a piano teaching device which includes indicating lights associated with the bass portion of a manual piano keyboard, and circuits responsive to the depression of a key on the treble portion of the keyboard and effective to illuminate lights indicative of an appropriate chord to be played with the melody note activated by the depressed key.

In U.S. Patent 3,335,630, issued Aug. 15, 1967, to Arthur R. Schmoyer there is disclosed a visual chord teaching device in which an indication of the appropriate keys to be depressed is provided by indicators visually associated with the appropriate keys and activated by the bass pedal appropriate to the desired chord. As set forth in the aforementioned patent, the student's thought process of associating the bass note pedal and the three chord note keys is expedited by providing the student with an indication of the appropriate triad of manual keys to be depressed, which indication is presented to the student simultaneously with the depression of the pedal key.

ENVIRONMENT OF THE INVENTION

While the aforedescribed teaching device is effective to the end that it expedites the student's process of locating the triad keys, it is sometimes desirable to have the student find the key locations without first depressing the bass pedal, and to find the key corresponding to the note by which the chord is known without depending upon a visual guide. The invention herein described stems from a realization of this need, and provides a visual chord keyboard teaching device which enables a student to read from conventionally written music a chord to be played, select the key corresponding to the note by which the chord is designated (known as the root note in the case of a fundamental chord) and have presented to him a visual display indicative of the other notes or keys which make up the triad, and the appropriate bass note. The key corresponding to the note by which the chord is designated is referred to herein as the selected key, while the keys corresponding to the notes making up the chord (including the selected key and the clavial key, if used) are referred to as companion keys. By this device, the student must first locate the root note and physically select the corresponding key by associating his playing finger with that key before the teaching aid comes into play, thus excessive reliance on the teaching aid as a "crutch" is avoided.

OBJECTS OF INVENTION

In addition to the aforesaid instructional advantage, this invention has among its objects:

(1) the provision of a teaching device which challenges a student to physically locate a designated key but assists him in his subsequent location of companion keys to be activated simultaneously with the designated key.

(2) the provision of a teaching device which permits the use of conventionally written sheet music in the instructional process, (3) the provision of a teaching device particularly adapted to a sustained note instrument, such as an organ, (4) the provision of a teaching device which is simple in construction and thus can be economically produced, (5) the provision of a keyboard teaching device particularly adapted to instruction in the playing of both major and minor chords on a sustained note instrument, (6) the provision of a keyboard teaching device which provides a student with visual instructional indications in advance of actual manipulation of a key, (7) the provision of a keyboard teaching device which provides a student with a visual instructional indication and with a visual error signal in event of erroneous key manipulation, and (8) the provision of a keying device having a high impedance input which enables keying signals to be derived from pre-existing circuits with minimal disturbance thereto.

DESCRIPTION OF DRAWINGS

These and other self-evident advantages and objects of the invention will be better understood by a consideration of the ensuing specification and the accompanying drawings which illustrated a preferred embodiment of the invention, and in which, FIGURE 1 is a schematic diagram of the invention, and FIGURE 2 is a schematic diagram of a switching device used in the circuit of FIGURE 1.

Referring to the drawings, and particularly to FIGURE 1, the schematic diagram discloses a plurality of keying switches 1, each of which is associated with and activated by depression of its respective key. Inasmuch as the circuitry associated with each key is similar throughout the system, like reference numerals will be applied throughout and a particular circuit element will be identified in the ensuing specification by the reference numeral plus a letter suffix indicative of the note of the particular key. Hence, the keying switch 1 for the key of C is designated herein as 1C. The keying switch 1 may be a mechanical switch or proximity sensor provided specifically for the purpose of the device as disclosed in the aforementioned Schmoyer et al. application Ser. No. 654,189, or may be a keying switch normal to the function of the machine with which this device is used. For example, the keying switch 1 may be the keying switch used in sounding an electronic organ wherein its function is shared to also key the circuit of this invention.

In the use of the system of this invention for a keyboard teaching device, a plurality of indicators are associated with keyboards, each indicator being visually associated with an individual key. In the case of an organ, these indicators include indicators 2 visually associated with keys of the lower manual keyboard, and indicators 3 visually associated with the pedals, or clavial keys. The visual association may be accomplished by locating the lamp directly above or to the rear of its associated key, by providing a lamp with appropriate indicia, or by placing a lamp under or incorporating it in the key to illuminate the key itself. While the system is described and illustrated as applied to a teaching device, it is apparent that other load devices such as sound producing mechanisms, may be substituted for the lamps 2 and 3 without departing from the spirit and scope of this invention.

Each of the load devices or indicators 2, 3 is connected to a common bus 4 which derives power from a source (designated B+) through dropping resistor 5. Activation of the circuit to energize a selected group of load devices is accomplished by completion of the load device circuit to ground return through a first circuit network comprising solid state switching devices 8 actuated by a selected key 1 characterizing the group. On the other hand, activation of undesired load devices which are not members of the selected group is prevented (i.e., inhibited) by a second circuit network including means actuated by the companion keys of the group and effective to inhibit activation of switching devices associated with the undesired load devices.

The switching device 8 referred to above and disclosed in the embodiment of FIGURE 1 is known as a Darlington transistor and is schematically represented in FIGURE 2 as two cascaded transistors 12 and 13, the transistor 13 having a base 14 connected to the emitter 15 of transistor 12 and the collectors 16, 17 of the respective transistor interconnected to provide a common collector lead 10. The resultant composite device may be viewed as having one emitter contact 9, one collector contact 10, and one base contact 11. Such device are commonly formed integrall (e.q., see Patent 2,985,804 issued May 23, 1961 to James L. Buie) to provide a single unit exhibiting high input impedance, low output impedance and a high degree of stability.

The Darlington transistor disclosed herein is merely exemplary of an appropriate switching device, it being readily understandable that a similar device such as a gate controlled switch may be substituted therefor without departing from the concept of this invention.

In the drawing, reference numerals have been applied to the circuit elements in only a limited number of instances in the interest of simplicity. It should be understood that where similar elements are referred to in association with the circuitry of different switching devices or indicators the same reference numeral is used followed by a suffix indicative of the particular associated switching element or indicator. Thus, switching element 8 for the key of C is designated 8C, while the switching element for the key G is designated 8G.

Considering first the activate circuit only, it is seen that the emitter 9 of switching device 8 is connected to ground, which in turn provides a return to the negative terminal of the voltage source (not shown). The collector 10 is connected to a distributing bus 7, there being one distributing bus for each switching device. The distributing bus 7 interconnects the collector 10 to each individual indicator 2 and 3 making up the group characterized by a particular switching device. In music, the chord of C consists of the notes C, E, and G. Hence, the group characterized by the switching device 8C comprises indicators 2C, 2E, 2G. In the case of the organ, the chord triad of C, E, & G as sounded from the manual keyboard is "rounded out" by the sounding of a bass note C in response to activation by a clavial pedal. Thus, the aforementioned group characterized by the switching device 8C additionally includes an indicator 3C visually associated with the clavial key for C. Consequently, the activate circuit for the group characterized by the key C includes switching device 8C, distributing bus 7C, indicators 2C, 2E, 2G, and 3C, and the associated supply circuit comprising bus 4, dropping resistor 5, the power source, and ground return.

Inasmuch as a given indicator may play a part in several different groups, it follows that each indicator will be interconnected to more than one distributing bus by indicator leads 6. In order to avoid sneak circuit energization of an inactivated bus 7 by an activated bus through the interconnection of the aforementioned indicator leads 6, each lead 6 has interposed therein a blocking diode 18 poled to permit current flow from the common bus 4, through the indicator 2, lead 6, distributing bus 7, and the activated switching device 8 to ground return. By the same token, current flow from other distributing buses 7 not associated with activated switching devices 8 (and consequently through other undesired indicators) which might otherwise occur through the interconnection of indicator leads 6 common to the activated indicator is blocked by the diode 18 in each such lead 6.

Summarizing the operation of the activate circuit as occurs in the case of the chord of C, closure of the key 1C applies a keying voltage to the base 11C of switching device 8C, thus switching it to an activate mode wherein a current path is established between the grounded emitter 19C and the collector 10C, effectively grounding distributing bus 7C. This bus is interconnected to indicator leads 6C–C, 6C–E, 6C–G, and to clavial indicator lead 19C. In the designation of indicator leads, the first letter of the suffix indicates the distributor bus to which it is connected, while the second letter designates the indicator to which it is connected. Thus, indicator leads 6C–C, 6C–E and 6C–G interconnect distributor bus 7C with each of the indicators 2C, 2E and 2G thus effectively grounding and energizing them. Sneak circuit energization of undesired indicators is prevented by blocking diodes 18 interposed in indicator leads 6 leading to indicators 2C, 2E and 2G from other distributing buses 7. The grounded distributor bus 7C is also connected to clavial indicator lead 19C, thus serving to energize clavial indicator 3C.

Illumination of the indicator 2C, 2E, 2G, and 19C in the foregoing manner indicates to the student that the group characterized by the key 1C which he has selected must be completed by simultaneously keying 1E and 1G (and clavial C) together with the selected key 1C. Hence, it becomes necessary to inhibit any activation of indicators common to groups characterized by the keys E and G and not included in the group characterized by C. To this end, the base circuit of each switching device 8 comprises a voltage divider network comprising keying resistor 20, input resistor 21, and bias resistor 22. Inhibit lines 23 interconnect the juncture of the keying resistor 20 and input resistor 21 with selected distributing buses 7 and have interposed therein inhibit blocking diodes 24, again to prevent "sneak circuit" interaction between distributor buses sharing a common inhibit circuit connection.

Considering now the inhibiting function imparted to the switching device for the key E which is to be keyed in the group C, E, G. Absent an inhibit circuit, closure of key 1E would be expected to activate switching device 8E and thus ground distributing bus 7E illuminating indicators 2E, 3E, 2Ab and 2B. While indicator 2E is already illuminated and thus grounding of it is of no concern, the other indicators are all undesired. Hence, it is necessary to inhibit the aforementioned activation of switching device 8E and this inhibiting is accomplished by the grounding of its base circuit through inhibit line 23 C–E (i.e., the inhibit line connecting distributing bus 7C with the base circuit of switching device 8E). Thus, input resistor 21E and bias resistor 22E are shunted to ground by inhibit line 23C–E, bus 7C and activated switching device 8C. Keying resistor 20E serves as a load to dissipate the keying voltage in the inhibit circuit and thus preserve sufficient keying voltage at the source to maintain the activate mode of operation of switching device 8C.

In a similar manner, the activation of switching device 8C and consequent grounding of distributor bus 7C serves to ground the base circuit of switching device 8G through inhibit line 23CG, shunting resistors 21G and 22G to ground and thus inhibiting switching device 8G.

It is generally contemplated that the teaching device of this invention would be used with an organ emitting sound during the instructional process wherein any error on the part of the student in failing to properly follow the indications by depressing the wrong triad of keys would be immediately evident by the resultant discord in the emitted sound. In the event that the invention is to be used with a non-musical keyboard, a mock instructional keyboard, or a muted instrument (as might be the case in classroom instruction of numerous pupils) it is highly desirable that the student be provided with a visual indication of error. In this regard, the particular use of a limited number of inhibit circuits provides such an indication by leaving uninhibited the indicators for notes occurring in groups or triads characterized by a root note positioned next to the notes of the desired group or triad. Thus, if a student depresses the key C, receives an indication that keys E and G are also to be depressed, and erroneously depresses the key F in lieu of key G, an error indication circuit will be established which causes a change of indication from the desired group or triad to an indication not suggestive of a harmoniously proper triad. Specifically with reference to the drawing, depression of the key F closes switch 1F, thus energizing switching devices 8F and grounding bus 7F and indicators 2C, 2F, 3F and 2A to illuminate them. At the same time, grounding of bus 7F inhibits switching device 8C thus extinguishing indicators 2E and 2G. Thus, a student committing an error by striking a key other than that called for by the indicator as being the proper companion to the originally selected root key is presented with an error signal in the form of a visual indication which changes dramatically upon depression of the erroneous key, in this case from the C–E–G indication to a C–F–A indication.

In summary, there is provided a teaching device for association with a keyboard which comprises a series of indicators, each of which is visually associated with an individual key of the keyboard. Depression of a selected key serves to illuminate indicators visually associated with that key and with companion keys which, with the selected key, comprise a group characterized by the selected key. Upon depression of the indicated companion keys the proper machine function is attained and no change occurs in the indication until terminated by release of the keys. Should an error be committed by depressing a key other than the ones corresponding to the activated indicators, a change in indication provides a signal of error.

While the invention has been described in connection with a device for instruction in the playing of a keyboard organ, it is within the concept of the invention to apply the concepts herein to the teaching of other keyboard devices wherein a group of keys is manipulated simultaneously. Thus, the foregoing specification is explanatory, and is not to be considered as the sole manner of use of this invention, the scope of which is to be determined by the following claims:

What is claimed is:

1. A keying system for a machine which includes control circuits corresponding to respective keys of a keyboard, said system comprising:
   (A) at least one keyboard including keys,
   (B) output means connecting said keying system with the respective control circuits of said machine,
   (C) a group of keys selected from said keys, said group having a predetermined relationship and including:
      (a) a selected individual key which characterizes said group, and
      (b) companion keys forming the remainder of the group,
   (D) static switching means associated with each said selected key and including a control element and output elements,
      (a) an input circuit operatively interconnecting said control element and its respective selected key,
      (b) a distributing bus circuit interconnecting an output element of said switching means with the system output means corresponding to said group of keys, and
      (c) an inhibit circuit interconnecting said distributing bus circuit of said selected individual key switching means with said input circuits of certain other of said switching means, whereby activation of said selected key switching means is effective to inhibit activation of said other switching means.

2. A keying system as set forth in claim 1 wherein said machine is a keyboard teaching device and said machine control circuits comprise activator circuits for indicator means visually associated with said keys.

3. A visual chord teaching device for use in instruction in the playing of chord triads with a sustained note musical instrument, said device comprising the system set forth in claim 2 wherein each said key corresponds to a note in a musical scale and wherein said inhibited certain other of said switching means comprise those switching means corresponding to said companion keys.

4. A keying system for a keyboard controlled machine as set forth in claim 1 wherein said static switching means comprises a high impedance input device and said input circuit is common to a circuit for control of a circuit other than said first named machine control circuits.

5. A keying system for a keyboard controlled machine as set forth in claim 1 wherein said input circuit includes means for producing a predetermined bias on said control element of said static switching means and said interconnected inhibit and bus circuits shunt said bias producing means through the output elements of said selected switching means upon activation thereof.

References Cited

UNITED STATES PATENTS

| | | | |
|---|---|---|---|
| 3,335,630 | 8/1967 | Schmoyer | 84—478 |
| 3,460,426 | 8/1969 | Jensen | 84—478 |

RICHARD B. WILKINSON, Primary Examiner

LAWRENCE R. FRANKLIN, Assistant Examiner